March 12, 1929.  J. H. MILLER  1,705,301
ELECTRICAL MEASURING INSTRUMENT
Filed March 10, 1928  2 Sheets-Sheet 1
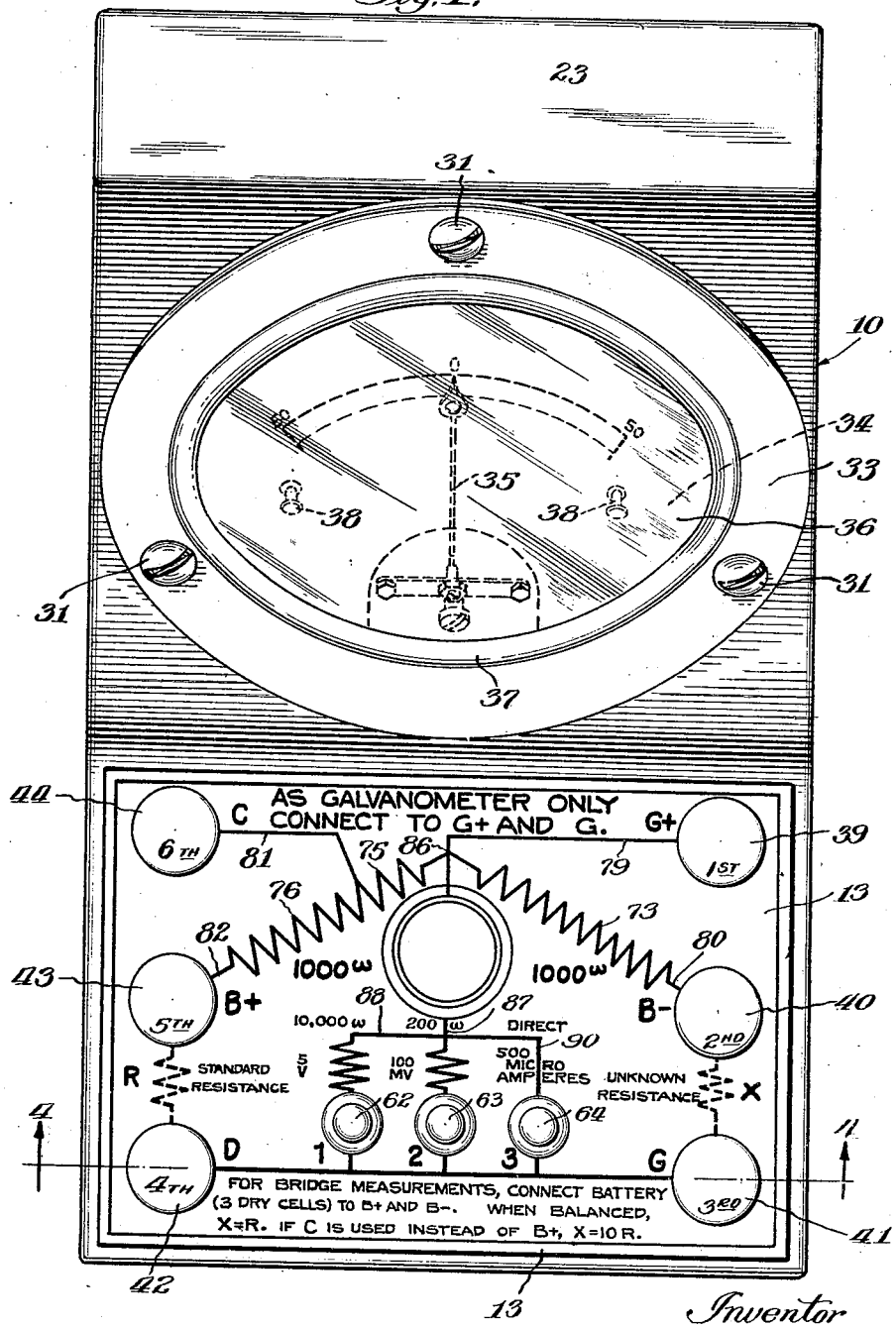
Inventor
John H. Miller
By Williams, Bradbury, McCaleb & Hinkle
Attys.

March 12, 1929.　　　J. H. MILLER　　　1,705,301
ELECTRICAL MEASURING INSTRUMENT
Filed March 10, 1928　　2 Sheets-Sheet 2
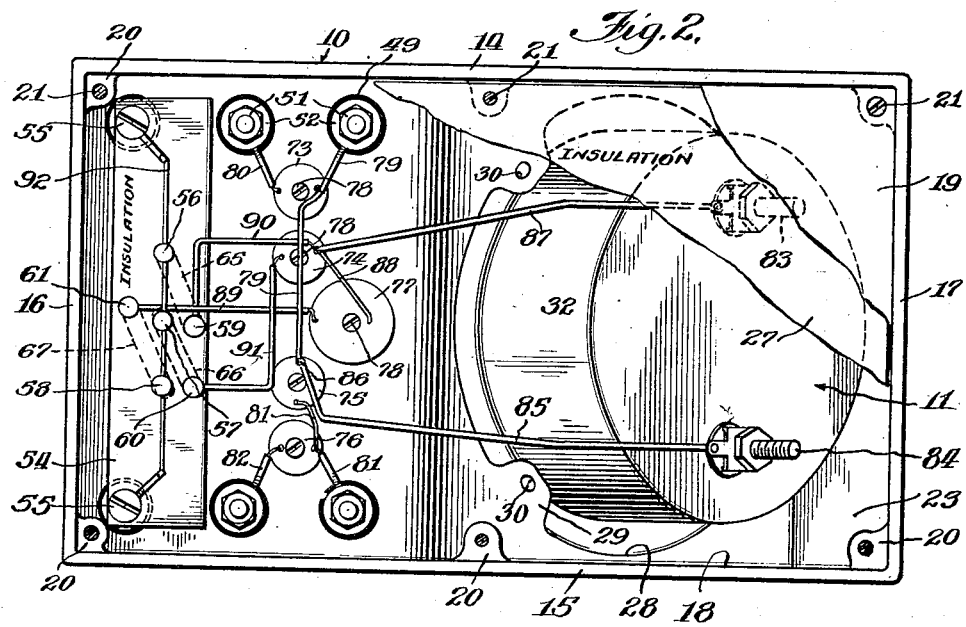
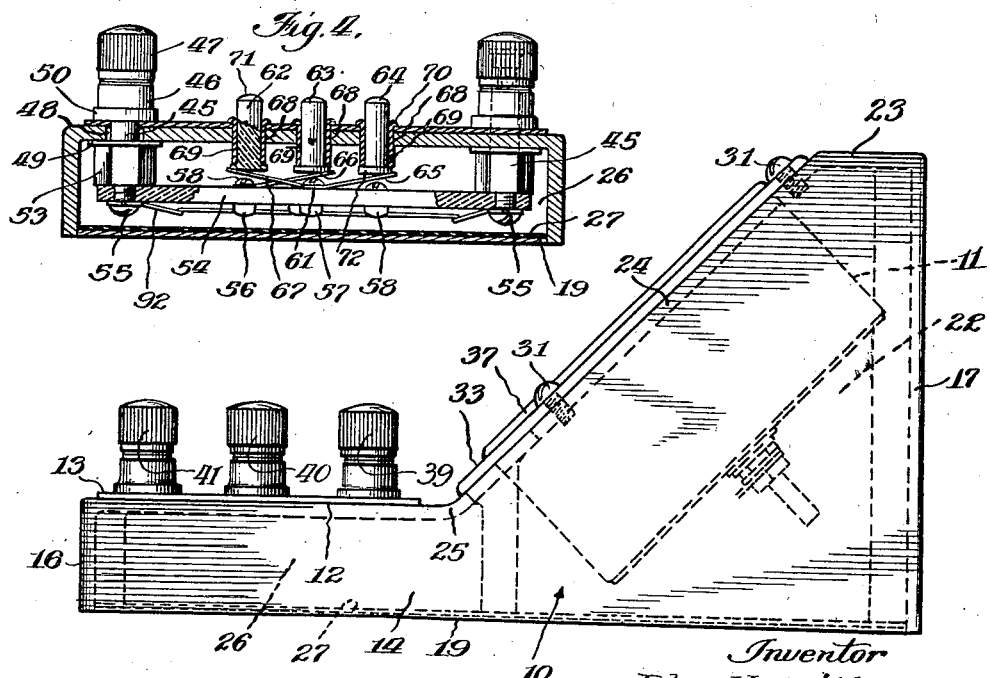
Inventor
John H. Miller
By Williams, Bradbury, McCabe & Hinkle
Attys.

Patented Mar. 12, 1929.

1,705,301

UNITED STATES PATENT OFFICE.

JOHN H. MILLER, OF OAK PARK, ILLINOIS, ASSIGNOR TO JEWELL ELECTRICAL INSTRUMENT CO., OF CHICAGO, ILLINOIS, A CORPORATION OF ILLINOIS.

ELECTRICAL MEASURING INSTRUMENT.

Application filed March 10, 1928. Serial No. 260,570.

The present invention relates to electrical measuring instruments, and is particularly concerned with galvanometers especially adapted for experimental work in the laboratories of schools, universities, etc.

One of the objects of the invention is the provision of a novel galvanometer casing adapted not only to house the standard galvanometer, but a plurality of additional electrical units in such manner that all of said units are conveniently disposed for use in performing various electrical experiments.

Another object of the invention is the provision of an electrical measuring instrument comprising a plurality of interconnected electrical units enclosed in a unitary casing, together with standard electrical connectors carried by said casing, said casing being provided with a permanent wiring diagram inscribed upon the face of the casing between said electrical connectors.

Another object of the invention is the provision of a unitary laboratory measuring instrument capable of many different uses and embodying the safety features of a full visibility wiring diagram having its terminals at standard electrical connectors, and of a plurality of high resistance test circuits with push button switches whereby a novice may close a circuit momentarily through the instrument without damaging the galvanometer, although he may have made the connections improperly.

Other objects and advantages of my invention will appear more fully from the following description and from the accompanying drawings in which similar characters of reference indicate similar parts throughout the several views.

In the drawings, Fig. 1 is a top plan view of my electrical measuring instrument;

Fig. 2 is a bottom plan view with the bottom plate broken away;

Fig. 3 is a side elevational view of the casing;

Fig. 4 is an elevational cross-sectional view taken on the line 4—4 of Fig. 1.

Referring to Figs. 2 and 3, 10 indicates in its entirety the casing for my electrical measuring instrument which may be constructed of cast metal or molded from plastic insulating compound such as bakelite. The casing 10 is adapted to enclose and support a plurality of standard electrical units such as a galvanometer, switches, resistances, etc., which comprise my measuring instrument. The shape of my casing is peculiarly adapted not only to support a standard galvanometer 11, but to provide a flat table 12 for carrying a wiring diagram plate 13 in convenient position for visibility and manipulation.

Thus the casing may be provided with vertical side walls 14, 15, 16 and 17 having an open bottom 18 of rectangular shape which may be closed by a cover plate 19 of sheet metal or insulating fiber. The casing may be cast or molded with integral lugs 20 at each corner and at the midpoints of the sides upon the interior, the lugs being depressed sufficiently below the lower edge of the wall to carry the bottom plate 19 flush with the bottom edge of the wall. The bottom plate may be secured by a plurality of screw bolts 21 passing through the plate and threaded into the lugs 20.

Where a metallic casing and bottom plate are employed, I prefer to insert a sheet 27 of insulating paper between the bottom plate and the lugs 20, thereby providing an insulating surface upon the base of the casing.

Referring to Fig. 3, it will be observed that the back wall 17 is made considerably higher than the front wall 16 in order to provide an enlarged chamber 22 adapted to receive the galvanometer 11. The upper edge of the back wall 17 also carries an integral forwardly extending upper wall 23 for the purpose of giving the chamber 22 sufficient depth to receive the galvanometer 11. Extending from the upper wall 23 the top of the casing is inclined downwards as at 24 at any convenient angle, in the present instance, approximately 45 degrees, extending to a point 25 where the upper wall of the casing extends horizontally to meet the front wall 16, forming a flat table 12 for carrying a permanent wiring diagram together with electrical connectors. The latter portion forms a relatively narrow chamber 26 of substantially rectangular section and adapted to receive a plurality of other electrical units for use with the galvanometer in performing electrical experiments.

The inclined top portion 24 of the casing may be provided with a circular aperture 28 having a plurality of inwardly extending lugs 29 with apertures 30 for securing the galvanometer by screw bolts 31. The galvanometer may be of any standard type, and its parts are therefore merely shown diagrammatically including a metallic casing 32 having an outwardly extending flange 33 adapted to overlie the upper wall 24 to which it is secured by the screw bolts 31.

The galvanometer is of course provided with the usual dial 34, pointer 35 and transparent cover 36 secured by a ring 37 and the instrument used should preferably be adapted to indicate in both directions from a central zero position. The motion of the pointer 35 is limited in either direction by stops 38.

The flat table portion 12 of the casing 10 is adapted to carry a wiring diagram plate 13 directly below the galvanometer 11 and in particular relation to a plurality of electrical connectors 39, 40, 41, 42, 43 and 44. In order to more particularly designate these connectors, the one numbered 39 will be called hereinafter the first connector, the one numbered 40 the second connector, the one numbered 41 the third connector, the one numbered 42 the fourth connector, the one numbered 43 the fifth connector and the one numbered 44 the sixth connector.

The electrical connectors 39 to 44 are of standard construction, each comprising a bolt 45 having an enlarged head of insulation 46 molded about its upper end with a non-removable clamping nut 47 secured thereto by being threaded on a reduced upper end of the portion 49. The bolt 45 passes through an enlarged aperture 48 in the casing where a metallic casing is employed and an insulating washer 50 spaces the head of the connector bolt from the metallic casing and insulates it electrically therefrom.

The first, second, fifth and sixth connectors have relatively short bolts 45 and are secured in place with the usual insulating washers 50 by means of nuts which may clamp electrical connectors against insulating washers 50.

The third and fourth connectors are in the present embodiment preferably provided with elongated bolts 45 and spacing sleeves 53 for the purpose of supporting an insulating bridge 54 which carries a plurality of resilient push button contacts further to be described.

All of the conductors herein described are preferably arranged in straight lines between points of connection and covered with insulation tubing called macaroni.

The bridge 54 may consist of a strip of insulating material secured to the bolts 45 of the third and fourth connectors by screw bolts 55 and the bridge may be provided with a plurality of apertures for receiving screw bolts 56, 57, 58, 59, 60 and 61. The screw bolts 56, 57 and 58 are preferably arranged in a row as they are adapted to provide the fixed contacts for a plurality of push button switches actuated by the push buttons 62, 63 and 64. The screw bolts 59, 60 and 61 may be suitably located at any other point in order that the resilient springs 65, 66 and 67 may be supported by the screw bolts 59, 60 and 61 respectively, with their free ends projecting above the heads of the bolts 56, 57 and 58 respectively.

The wiring diagram plate 13 is of course retained in place upon the table 12 by means of the electrical connectors 39 to 44 inclusive, passing through apertures in both the plate and casing. The plate 13 and table 12 of the casing may also be provided with a row of apertures 68, in the present instance three apertures being provided for receiving metallic sleeves 69 which slidably support the push buttons 62, 63 and 64.

The sleeves 69 may be rolled outward as at 70 riveting their upper ends into the wiring diagram plate 13 and permanently securing them in place with a rounded upper flange. The push buttons 62, 63 and 64 may comprise cylindrical insulating members of bakelite or the like, having rounded upper ends 71 for convenient contact with the fingers and having outwardly extending flanges 72 at their lower ends, adapted to engage the lower ends of the sleeves 69 and limit the upward movement of the push buttons. The resilient springs 65, 66 and 67 which form the movable contacts of the push buttons are biased to the upper position as shown in Fig. 4, maintaining the push buttons out of contact with the bolts 56, 57 and 58 which form the fixed contacts.

I shall now describe the other electrical units which are housed within the portion 26 of the casing to be used in conjunction with the galvanometer.

Carried by insulating spools 73, 74, 75, 76 and 77 are a plurality of coils of insulated resistance wire of various values hereinafter to be described. The spools 73 to 77 may be constructed of bakelite and secured to the casing by screw bolts 78 passing through their axes and threaded into the casing. The resistance upon the spool 73 which will be designated by the same numeral is preferably made 1000 ohms, one end of the resistance being connected by a conductor 79 to the first electrical connector. The other end of the resistance 73 is connected by a conductor 80 to the second electrical connector. The resistance 75 has one end connected to the conductor 79 which leads to the first electrical connector and the other end connected by a conductor 81 to the resistance 76. The conductor 81 may continue from the resistance 76 to the sixth connector and the opposite end of the resistance 76 may be connected by a conductor 82 to the fifth connector.

It will thus be observed that although in fact the resistances 75 and 76 are on different spools, they may be represented as shown at 75 and 76 in Fig. 1 as one complete resistance having a tap taken off by means of the conductor 81 at an intermediate point and connected to the sixth connector. The value of the resistance 73 is preferably made 1000 ohms as indicated by the legend upon the wiring diagram plate and the combined resistances 75 and 76 are also made 1000 ohms, resistance 75 being 100 ohms and resistance 76 being 900 ohms.

The terminals 83 and 84 of the galvanometer may be connected to the foregoing resistances after the usual manner of a Wheatstone bridge, a conductor 85 leading from the terminal 84 to the conductor 79 at the point 86 which corresponds to the upper midpoint 86 upon the wiring diagram.

The opposite terminal 83 of the galvanometer is connected by a conductor 87 to a conductor 88 connecting a plurality of resistance coils in parallel through the push button switches 62, 63 and 64.

Thus, the spool 77 is provided with a resistance coil which may be of the value of 10,000 ohms, having one end connected by a conductor 88 to conductor 87 to the galvanometer and the other end connected by conductor 89 to screw bolt 61 and resilient spring 67 beneath the push button numbered 1. The resistance carried by spool 74 may consist of a coil of 200 ohms having one end connected to the conductors 87, 88 and 90, and the other end connected to the conductor 91 which leads to the screw bolt 60, supporting resilient spring 66 beneath push button 2 over fixed contact 57. The conductor 90 extends directly from the galvanometer lead 87 to screw bolt 59 which supports resilient spring 65 over fixed contact 56 under the third push button.

Referring to Fig. 4, it will be noted that the third and fourth electrical connectors are connected by means of the screw bolts 55 with a conductor 92 which conductor is also in electrical connection with the fixed contacts 56, 57 and 58. It will thus be observed that the push button 1 is in series with the 10,000 ohm resistance 77 through the galvanometer, while the push button 2 is in series with the 200 ohm resistance through the galvanometer and the push button 3 is in direct series connection with the galvanometer through the conductor 90. As indicated in Fig. 1 in the dotted lines upon the wiring diagram between the fourth and fifth connectors, it is intended that a standard electrical resistance R of known value be connected between these connectors. The unknown resistance X may be connected between the second and third connectors as indicated in dotted lines in Fig. 1. When the resistances have been so balanced that the galvanometer shows a zero indication, it will be evident that the usual ratio will exist between the resistances of the Wheatstone bridge, and since the resistances 75 and 73 are equal, each being 1000 ohms, the unknown resistance will be equal to the standard resistance. It should be noted, of course, that it is also necessary to supply the instrument with a source of electromotive force which should be connected to the connectors B+ and B−, and the proper value of this electromotive force is appropriately indicated upon the wiring diagram as three dry cells.

Where it is desired to measure an unknown resistance of greater value, the plus battery connection may be made to the sixth connector C, thereby utilizing upon one side of the Wheatstone bridge a resistance of 100 ohms. When the bridge is in balance and the galvanometer shows a zero indication, the ratio of the standard resistance to the unknown resistance will be as 1 is to 10, and the unknown resistance will be equal to ten times the standard resistance, that is, X equals 10R as is appropriately indicated by the legend upon the plate.

It is a matter of common knowledge that where galvanometers are used in experimental work by students or novices in the electrical art, the connections are frequently improperly made and when the single push button switch which is usually provided, is closed, an excessive current is impressed upon the galvanometer, the needle is forcibly thrown to the left or right against one of the stops 38 and as a general rule the needle is bent and the instrument damaged. In order to avoid these accidents, I have provided my measuring instrument with three push buttons numbered 1, 2 and 3, the first push button closing the galvanometer circuit through a very high resistance of about 10,000 ohms, the second closing it through a resistance of about 200 ohms, and the third placing the galvanometer in direct connection across the Wheatstone bridge. It will thus be observed that although the connections may be improperly made if the first push button is pushed and any substantial indication is made upon the galvanometer, this will show that too much current is impressed upon the galvanometer and the connections may be corrected. If, however, the first push button produces no effect, the second may be used and then the third, finally placing the galvanometer in direct connection, thereby providing a convenient method of testing faulty circuits without damaging the galvanometer. It should also be noted that my measuring instrument may be used in a plurality of other ways; for instance, if it is desired to use the galvanometer separately, connection may be made to the first connector G+ and to the third connector G, whereupon the galvanometer is available for use through the safety push buttons 1, 2 and 3.

The resistances of 900, 100 and 1000 ohms may also be used if desired, connections for 900 ohms being made through the fifth and sixth connectors, B+ and C; connection for 100 ohms through the first and sixth connectors G+ and C, and connection for 1000 ohms through the first and second connectors G+ and B−.

It is also possible to use the resistance of 10,000 ohms by connecting to the first and third connectors G+ and G through the first push button and in a similar manner, the 200 ohm resistance may be used by pressing the second push button.

One of the most important features of my invention comprises the wiring diagram plate 13 which consists of a metallic plate having the wiring diagram as shown in Fig. 1 permanently inscribed upon its surface with the terminals of the wiring diagram leading to the connectors 39 to 44 inclusive. It is thus made possible for anyone to understand exactly what electrical units are contained within the casing and connections may be made and traced by merely connecting to the electrical connectors carried by the casing at the terminals of the diagram. This feature is of considerable educational value as it enables a student to understand the electrical connections which he is making without extended study.

It will thus be observed that I have invented an electrical laboratory instrument which is capable of many uses in performing electrical experiments and which comprises a plurality of electrical units enclosed in a casing, said units being suitably represented upon a wiring diagram on the face of the casing, with electrical connectors suitably located at the terminals of the wiring diagram. The operator is thus enabled to see at a glance what electrical units will be brought into connection between any two or more electrical connectors, and although the casing contains a number of units of different values and uses, all of these units are available for use by means of my combined wiring diagram and connectors.

While I have illustrated a specific embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In an electrical measuring instrument, the combination of a casing having side walls and an upper face having an inclined portion for carrying a dialed instrument and a substantially horizontal portion below said inclined portion for carrying circuit connectors with a plurality of interconnected electrical units and a circuit diagram of said units, having its terminals at said circuit connectors.

2. In an electrical measuring instrument, a casing having an upper portion with an inclined face for carrying a galvanometer and a lower portion having a horizontal face for carrying a circuit diagram and electrical connectors at the terminals of said diagram.

3. In an electrical measuring instrument, a casing having an upper portion with an inclined face for carrying a galvanometer and a lower portion having a horizontal face for carrying a circuit diagram and electrical connectors at the terminals of said diagram, a galvanometer carried in said inclined face, and a plurality of electrical connectors carried by said horizontal face.

4. In an electrical measuring instrument, a casing having an upper portion with an inclined face for carrying a galvanometer and a lower portion having a horizontal face for carrying a circuit diagram and electrical connectors at the terminals of said diagram, a galvanometer carried in said inclined face, a plurality of electrical connectors carried by said horizontal face, conductors between said galvanometer and certain of said connectors, and a plurality of parallel switch circuits of graduated resistance and each having a test switch interposed in series with said galvanometer.

5. In an electrical measuring instrument, a casing having an upper portion with an inclined face for carrying a galvanometer and a lower portion having a horizontal face for carying a circuit diagram and electrical connectors at the terminals of said diagram, a galvanometer carried in said inclined face, a plurality of electrical connectors carried by said horizontal face, conductors between said galvanometer and certain of said connectors, and a plurality of parallel switch circuits of graduated resistance and each having a test switch interposed in series with said galvanometer, one of said parallel switch circuits being directly connected to said galvanometer.

6. In an electrical measuring instrument, the combination of a galvanometer with a casing for carrying said galvanometer, a pair of electrical connectors carried by said casing, an insulating member carried in said casing by said connectors, a plurality of resilient contacts carried by said member, a plurality of corresponding fixed contacts carried by said member and connected with said connectors, push buttons slidably mounted in said casing above said resilient contacts, and graduated resistances carried in said casing in series with said resilient contacts and said galvanometer.

7. In an electrical measuring instrument, the combination of a supporting member having a wiring diagram thereon with a plurality of electrical connectors carried by said member at the terminals of said diagram, and a plurality of electrical units and conductors corresponding to said diagram and interconnected with said connectors, whereby the connections through said connectors, conductors and units may be seen directly from said diagram.

8. In an electrical measuring instrument, the combination of a wiring diagram plate with a plurality of electrical connectors carried by said plate at the terminals of said diagram, a plurality of electrical units and conductors corresponding to said diagram, interconnected with said connectors, and a casing enclosing said units and carrying said plate upon its face.

9. In an electrical measuring instrument, the combination of a wiring diagram plate with a plurality of electrical connectors carried by said plate at the terminals of said diagram, a plurality of electrical units and conductors corresponding to said diagram, interconnected with said connectors, a casing enclosing said units and carrying said plate upon its face, said units comprising a galvanometer and two resistances each having a terminal connected to the first of said connectors, the opposite terminals of said resistances being connected to second and fifth of said connectors, and the opposite terminal of said galvanometer being connected through a switch to the third and fourth of said connectors.

10. In an electrical measuring instrument, the combination of a wiring diagram plate with a plurality of electrical connectors carried by said plate at the terminals of said diagram, a plurality of electrical units and conductors corresponding to said diagram, interconnected with said connectors, a casing enclosing said units and carrying said plate upon its face, said units comprising a galvanometer and two resistances each having a terminal connected to the first of said connectors, the opposite terminals of said resistances being connected to second and fifth of said connectors, the opposite terminal of said galvanometer being connected through a switch to the third and fourth of said connectors, and a tap connected to the sixth of said connectors and one of said resistances at a fractional part of its length.

11. In an electrical measuring instrument, the combination of a wiring diagram plate with a plurality of electrical connectors carried by said plate at the terminals of said diagram, a plurality of electrical units and conductors corresponding to said diagram, interconnected with said connectors and symbols carried by said plate indicating electrical values of said units.

In witness whereof, I hereunto subscribe my name this 8th day of March, 1928.

JOHN H. MILLER.